(12) United States Patent
Preisler et al.

(10) Patent No.: US 8,859,074 B2
(45) Date of Patent: Oct. 14, 2014

(54) SANDWICH-TYPE, GENERALLY PLANAR, STRUCTURAL MEMBER HAVING AN ATTACHMENT FEATURE AND ASSEMBLY UTILIZING SAME

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 13/762,904

(22) Filed: Feb. 8, 2013

(65) Prior Publication Data

US 2013/0278020 A1 Oct. 24, 2013

Related U.S. Application Data

(63) Continuation-in-part of application No. 13/690,265, filed on Nov. 30, 2012, now Pat. No. 8,808,831, which is a continuation-in-part of application No. 13/688,972, filed on Nov. 29, 2012, now Pat. No. 8,795,807, and a continuation-in-part of application No. 13/453,269, filed on Apr. 23, 2012, now Pat. No. 8,795,465.

(51) Int. Cl.
*B62D 25/20* (2006.01)
*B60R 13/01* (2006.01)
*B60R 13/02* (2006.01)

(52) U.S. Cl.
CPC ............. *B62D 25/20* (2013.01); *B60R 13/011* (2013.01); *B60R 13/0206* (2013.01)

USPC .......... 428/99; 296/39.1; 296/39.2; 296/39.3; 296/97.23; 428/95; 428/98; 428/116

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| 5,298,694 A | 3/1994 | Thompson et al. |
| 5,502,930 A | 4/1996 | Burkette et al. |

(Continued)

OTHER PUBLICATIONS

Office Action; corresponding U.S. Appl. No. 13/688,972; date of mailing Mar. 28, 2014.

(Continued)

*Primary Examiner* — Brent O'Hern
(74) *Attorney, Agent, or Firm* — Brooks Kushman P.C.

(57) ABSTRACT

A sandwich-type, generally planar, structural member having an attachment feature and an assembly utilizing same are provided. The member includes a first outer layer having an outer surface, a second outer layer and a core positioned between the outer layers and having a large number of cavities. The outer layers are bonded to the core by press molding. A portion of the member is locally crushed by the press molding to form a depression. The depression has bottom and side surfaces formed by the first outer layer. The member further includes a connector fixedly secured to the bottom surface of the depression to attach a second generally planar member to the first outer layer of the structural member.

23 Claims, 2 Drawing Sheets

(56) References Cited

U.S. PATENT DOCUMENTS

| | | | |
|---|---|---|---|
| 5,915,445 A | 6/1999 | Rauenbusch | |
| 5,979,962 A | 11/1999 | Balentin et al. | |
| 6,050,630 A | 4/2000 | Hochet | |
| 6,102,464 A | 8/2000 | Schneider et al. | |
| 6,435,577 B1 | 8/2002 | Renault | |
| 6,537,413 B1 | 3/2003 | Hochet et al. | |
| 6,631,785 B2 | 10/2003 | Khambete et al. | |
| 6,655,299 B2 | 12/2003 | Preisler et al. | |
| 6,659,223 B2 | 12/2003 | Allison et al. | |
| 6,682,675 B1 | 1/2004 | Vandangeot et al. | |
| 6,682,676 B1 | 1/2004 | Renault et al. | |
| 6,748,876 B2 | 6/2004 | Preisler et al. | |
| 6,790,026 B2 | 9/2004 | Vandangeot et al. | |
| 6,793,747 B2 | 9/2004 | North et al. | |
| 6,823,803 B2 | 11/2004 | Preisler | |
| 6,843,525 B2 | 1/2005 | Preisler | |
| 6,890,023 B2 | 5/2005 | Preisler et al. | |
| 6,918,625 B2 | 7/2005 | Storto et al. | |
| 6,981,863 B2 | 1/2006 | Renault et al. | |
| 7,014,259 B2 | 3/2006 | Heholt | |
| 7,059,646 B1 | 6/2006 | DeLong et al. | |
| 7,090,274 B1 | 8/2006 | Khan et al. | |
| 7,093,879 B2 | 8/2006 | Putt et al. | |
| 7,264,685 B2 | 9/2007 | Katz et al. | |
| 7,320,739 B2 | 1/2008 | Thompson, Jr. et al. | |
| 7,322,629 B2 | 1/2008 | McClintock | |
| 7,402,537 B1 | 7/2008 | Lenda et al. | |
| 7,419,713 B2 | 9/2008 | Wilkens et al. | |
| 7,748,775 B2 | 7/2010 | Mercurio | |
| 7,837,009 B2 | 11/2010 | Gross et al. | |
| 7,909,379 B2 | 3/2011 | Winget et al. | |
| 7,918,313 B2 | 4/2011 | Gross et al. | |
| 7,919,031 B2 | 4/2011 | Winget et al. | |
| 8,117,972 B2 | 2/2012 | Winget et al. | |
| 8,622,456 B2 | 1/2014 | Preisler et al. | |
| 8,690,233 B2 | 4/2014 | Preisler et al. | |
| 2003/0079659 A1* | 5/2003 | Preisler et al. | 108/51.3 |
| 2005/0189674 A1 | 9/2005 | Hochet et al. | |
| 2006/0255611 A1 | 11/2006 | Smith et al. | |
| 2008/0145635 A1 | 6/2008 | Stoll et al. | |
| 2008/0185866 A1 | 8/2008 | Tarrant et al. | |
| 2010/0026031 A1 | 2/2010 | Jouraku | |
| 2011/0315310 A1 | 12/2011 | Trevisan et al. | |
| 2013/0278002 A1 | 10/2013 | Preisler et al. | |
| 2013/0278003 A1 | 10/2013 | Preisler et al. | |
| 2013/0278009 A1 | 10/2013 | Preisler et al. | |
| 2013/0278015 A1 | 10/2013 | Preisler et al. | |
| 2013/0278018 A1 | 10/2013 | Preisler et al. | |
| 2013/0278019 A1 | 10/2013 | Preisler et al. | |
| 2013/0278020 A1 | 10/2013 | Preisler et al. | |
| 2013/0280469 A1 | 10/2013 | Preisler et al. | |
| 2013/0280472 A1 | 10/2013 | Preisler et al. | |
| 2013/0280473 A1 | 10/2013 | Preisler et al. | |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

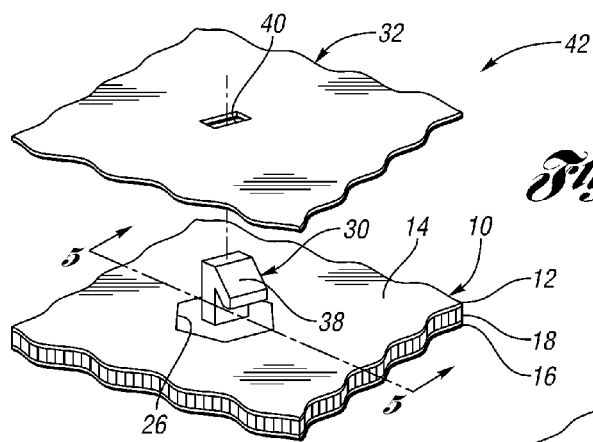
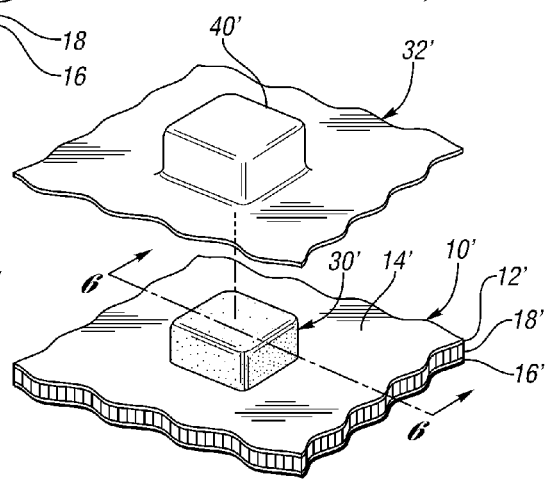
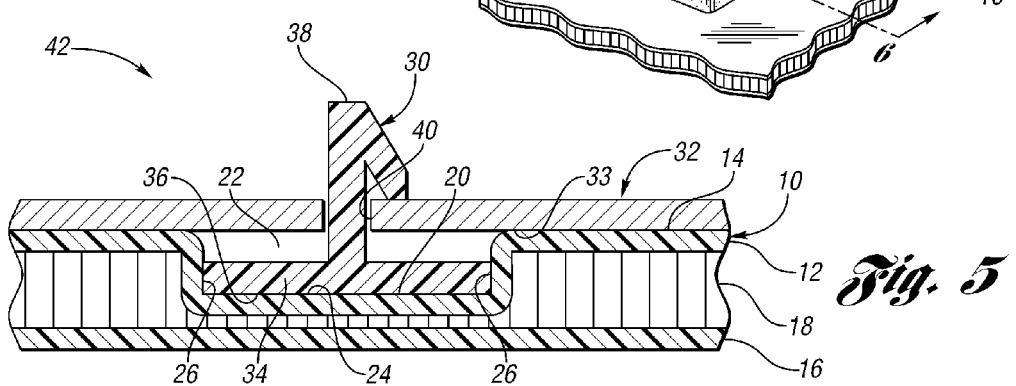
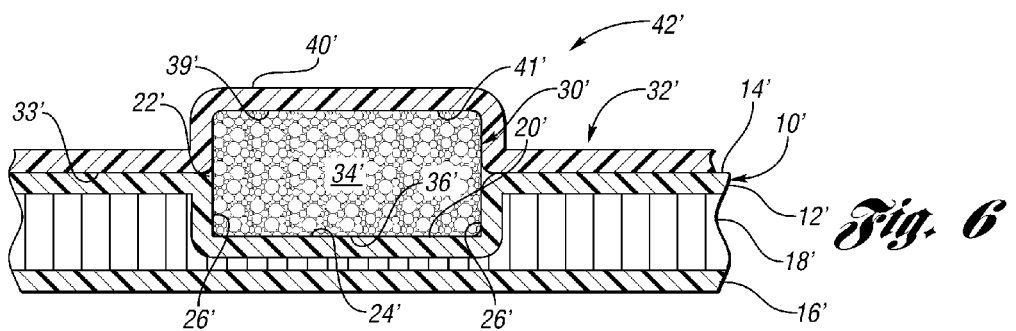

SANDWICH-TYPE, GENERALLY PLANAR, STRUCTURAL MEMBER HAVING AN ATTACHMENT FEATURE AND ASSEMBLY UTILIZING SAME

CROSS-REFERENCE TO RELATED APPLICATIONS

This application is a continuation-in-part of U.S. application Ser. No. 13/690,265 filed Nov. 30, 2012 which, in turn, is a continuation-in-part of both U.S. application Ser. No. 13/688,972 filed Nov. 29, 2012 and U.S. application Ser. No. 13/453,269 filed Apr. 23, 2012. The disclosures of these pending applications are incorporated in their entirety by reference herein.

TECHNICAL FIELD

This invention relates, in general, to sandwich-type, generally planar, structural members and assemblies utilizing same and, in particular, to such members and assemblies which have an attachment feature especially for use in the interior of a vehicle.

Overview

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load bearing capacity of the composite component.

As a result of their high stiffness-to-weight ratio and load-bearing capacity, such compression-molded composites have been used as load floors in automotive applications and as skis or snowboards (i.e., sliding boards) in recreational applications.

One problem associated with such composites is that their function and design freedom is limited by their designed material thickness.

It is often highly desirable to secure hardware and other components to composite components. In automotive applications, such as rear load-bearing load floors, it is desirable to provide attachment mechanisms at various locations to secure cargo to protect the cargo from sliding, rolling, etc. which tends to damage the cargo as well as other items or structures in the cargo area.

Because of the large forces that cargo as well as individuals can exert on the load floor, any attachment or fastening mechanism must be able to withstand not only large pull-out forces but also large push-in forces. Also, such attachment or fastening mechanisms must be able to withstand large torque forces to prevent the mechanisms from being "torqued out" of or "torqued into" the composite components.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,843,525; 6,890,023; 6,981,863; 7,014,259; 7,090,274; 7,093,879; 7,264,685; 7,320,739; 7,402,537; 7,419,713; 7,837,009; 7,909,379; 7,918,313; 7,919,031; 8,117,972; 2005/0189674; 2006/0255611; 2008/0185866 and 2011/0315310.

Another problem associated with the prior art is that by providing an attachment feature for such composites, the attachment feature takes up valuable cargo space and may not be able to withstand large pull-out and push-in forces and torque.

SUMMARY OF EXAMPLE EMBODIMENTS

An object of at least one embodiment of the present invention is to provide a sandwich-type, generally planar, structural member having an attachment feature capable of withstanding large forces and torques and an assembly utilizing such a structural member to improve assembling workability and increase design freedom while minimizing the amount of space required for the attachment feature.

In carrying out the above object and other objects of at least one embodiment of the present invention, a sandwich-type, generally planar, structural member having an attachment feature is provided. The member includes a first outer layer having an outer surface, a second outer layer and a core positioned between the outer layers. The core has a large number of cavities. The outer layers are bonded to the core by press molding. A portion of the member is locally crushed by the press molding to form a depression having bottom and side surfaces formed by the first outer layer. The member also includes a connector fixedly secured to the bottom surface of the depression to attach a second, generally planar member to the first outer layer of the structural member.

The bottom surface of the depression may be planar and the connector may include a base portion having a planar surface which opposes and contacts the planar bottom surface of the depression.

The base portion may be sized and shaped to correspond to the size and shape of the depression to locate the connector within the depression.

The crushed portion of the structural member may be completely enclosed by the rest of the structural member.

The connector may comprise a plastic clip bonded to the bottom surface of the depression and extending above the depression.

The connector may comprise a plastic structure having a large number of cavities, bonded to the bottom surface of the depression and extending above the depression.

The core may be a cellular core.

The core may be a honeycomb core.

The outer layers may be fiber-reinforced layers.

The structural member may have a thickness in a range of 5 to 25 mm.

At least one of the outer layers may be a woven outer layer.

Further in carrying out the above object and other objects of at least one embodiment of the present invention, a sandwich-type, structural panel having an attachment feature for use in the interior of a vehicle is provided. The panel includes a first outer layer having an outer surface, a second outer layer and a core positioned between the outer layers, the core having a large number of cavities. The outer layers are bonded to the core by press molding. A portion of the panel is locally crushed by the press molding to form a depression having bottom and side surfaces formed by the first outer layer. The panel also includes a connector fixedly secured to the bottom surface of the depression to attach a generally planar member to the first outer layer of the panel.

The bottom surface of the depression may be planar and the connector may include a base portion having a planar surface which opposes and contacts the planar bottom surface of the depression.

The base portion may be sized and shaped to correspond to the size and shape of the depression to locate the connector within the depression.

The crushed portion of the panel may be completely enclosed by the rest of the panel.

The connector may comprise a plastic clip bonded to the bottom surface of the depression and extending above the depression.

The connector may comprise a plastic structure having a large number of cavities, bonded to the bottom surface of the depression and extending above the depression.

Still further in carrying out the above object and other objects of at least one embodiment of the present invention, an assembly for use in the interior of a vehicle is provided. The assembly includes a generally planar first member and a sandwich-type, generally planar, structural member having an attachment feature. The structural member has a first outer layer with an outer surface, a second outer layer and a core positioned between the outer layers. The core has a large number of cavities. The outer layers are bonded to the core by press molding. A portion of the structural member is locally crushed by the press molding to form a depression having bottom and side surfaces formed by the first outer layer and having a predetermined depth. The structural member further has a connector fixedly secured to the bottom surface of the depression which attaches the members together to form the assembly.

The connector may include a base portion which is sized and shaped to correspond to the size and shape of the depression to locate the connector within the depression.

The members may have opposed planar surfaces contacting each other about the crushed portion.

The connector may include a clip portion and the first member may include an aperture. The clip portion may be received and retained within the aperture to unitarily connect the members and form the assembly.

The first member may include a depression of a predetermined depth. The depressions may define a connector-receiving cavity having a height substantially equal to a sum of the depths.

The connector may be inserted into the depression of the first member so that corresponding surfaces of the depression of the first member and the connector are in abutting engagement to unitarily connect the members and form the assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

BRIEF DESCRIPTION OF THE DRAWINGS

FIG. 3 is a perspective view, partially broken away and in cross section, of first and second generally planar members one of which is a structural member constructed in accordance with at least one embodiment of the present invention, prior to assembling the members together;

FIG. 4 is a view, similar to the view, of FIG. 3, of first and second generally planar members one of which is a structural member constructed in accordance with at least one other embodiment of the present invention, prior to assembling the members together;

FIG. 5 is a side view, partially broken away and in cross section, taken along lines 5-5 of FIG. 3 after the first and second members are assembled or attached together; and FIG. 6 is a view, similar to the view of FIG. 5, taken along lines 6-6 of FIG. 4.

DETAILED DESCRIPTION

Figure 1:
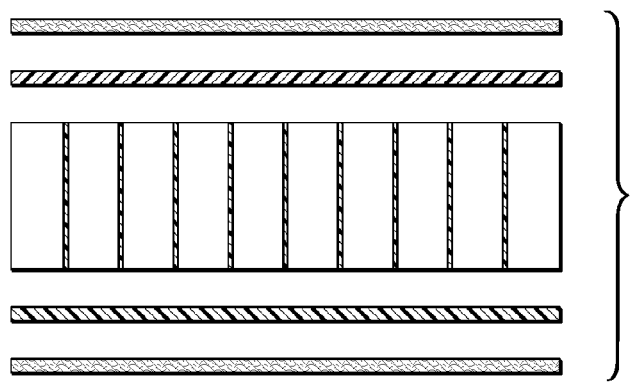
FIG. 1 is a side sectional view showing various separate layers of a prior art stack of thermoplastic-based layers of material.
Figure 2:
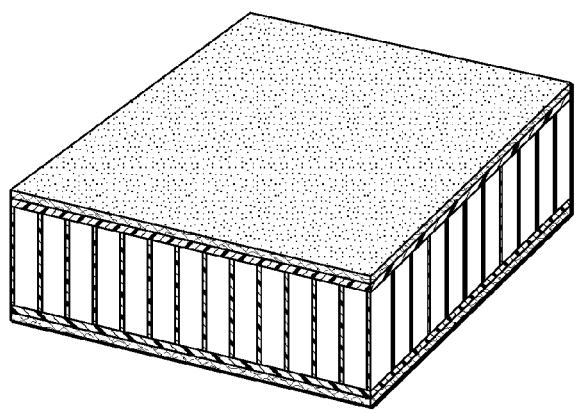
FIG. 2 is a top perspective view of the stack of FIG. 1 after compression molding.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring again to the drawing Figures, FIGS. 3 and 5 illustrate a first embodiment of a sandwich-type, generally planar, structural member, generally indicated at 10, having an attachment feature and FIGS. 4 and 6 illustrate a second embodiment of such a member, generally indicated at 10'. Since the members 10 and 10' are substantially identical except for their attachment features, parts of the second embodiment have the same reference numbers as the parts of the first embodiment but with a single prime designation.

Each of the members 10 and 10' include a first outer layer 12 or 12' having an outer surface 14 or 14', a second outer layer 16 or 16' and a core 18 or 18' positioned between the outer layers and having a large number of cavities. The outer layers 12 and 16 (FIGS. 3 and 5) or 12' and 16' (FIGS. 4 and 6) are bonded to the core 18 or 18' by press molding. A portion 20 or 20' of the member 10 or 10' is locally crushed by the press molding to form a depression 22 or 22' having bottom and side surfaces 24 or 24' and 26 or 26', respectively, formed by the first outer layer 12 or 12'. The crushed portion 20 or 20' of the structural member 10 or 10' is completely enclosed by the rest of the structural member 10 or 10'. In general, as described below, the members 10 and 10' are formed in the same fashion and, consequently, only formation of the member 10 is described.

The member 10 or 10' also includes a connector, generally indicated at 30 in FIGS. 3 and 5 and at 30' in FIGS. 4 and 6, fixedly secured to the bottom surface 24 or 24' of the depression 22 or 22' to attach a second generally planar member generally indicated at 32 in FIGS. 3 and 5 and 32' in FIGS. 4 and 6 to the first outer layer 12 or 12' of the structural member 10 or 10'. Again, the same or similar parts between the embodiments have the same reference number but the parts of the second embodiment have a single prime designation.

In each of the embodiments, the bottom surface 24 or 24' of the depression 22 or 22' is planar. The connector 30 or 30' includes a base portion 34 or 34' having a planar surface 36 or 36' which opposes and contacts the planar bottom surface 24 or 24' of the depression 22 or 22'. The base portion 34 or 34' is sized and shaped to correspond to the size and shape of its corresponding depression 22 or 22' to properly locate the connector 30 or 30' within its depression 22 or 22'. This feature also resists rotary motion of the connector 30 or 30' within the depression 22 or 22' caused by the application of torque to the connector 30 or 30'.

In the embodiment of FIGS. 3 and 5, the connector 30 includes a resilient plastic clip portion 38 which is bonded via its base portion 34 to the bottom surface 24 of the depression 22 and extends above the depression 22.

In the embodiment of FIGS. 4 and 6, the connector 30' includes a resilient plastic structure such as a plastic foam block (which has closed cells) having a large number of cavities. The block 30' is bonded via its base portion 34' to the bottom surface 24' of the depression 22' and extends above the depression 22'.

In both embodiments, the members 10 and 32 or the members 10' and 32' have opposed planar surfaces 14 or 14', and 33 or 33' contacting each other about the crushed portion 20 and 20'.

In the first embodiment, the first member 32 includes an aperture 40. The clip portion 38 of the connector 30 is received and retained within the aperture 40 to unitarily connect the members 10 and 32 and form an assembly, generally indicated at 42.

In the second embodiment, the first member 32' includes a depression 39' of a predetermined depth within a raised plateau portion 40'. The depressions 22' and 39' define a connector-receiving cavity 41' having a height substantially equal to a sum of the depths of the depressions 22' and 39'. The connector or block 30' is inserted into the depression 39' of the first member 32' so that corresponding surfaces of the depression 39' and the connector 30' are in abutting engagement to unitarily connect the members 10' and 32' and form an assembly, generally indicated at 42'.

It is to be understood that the assemblies 42 and 42' constructed in accordance with at least one embodiment of the present invention may be used in a wide variety of environments such as in the interior or exterior of a motor vehicle.

The outer layers 12 and 16 are bonded to the core 18 by press molding typically after pre-heating the outer layers 12 and 16. The outer layers 12 and 16 are preferably fiber-reinforced thermoplastic layers. The thermoplastic may be a polyolefin such as polypropylene. The thermoplastic may alternatively be polyurethane. The fiber-reinforcement may be a glass mat, a natural fiber mat, or a woven or non-woven mat.

The core 18 may be a cellular core having a thermoplastic honeycomb structure. The core 18 may also be made of polypropylene honeycomb, aluminum honeycomb, balsa and polyurethane foam. The resulting composite component or member 10 typically includes a lightweight, low density core such as the core 18 together with fiber-reinforced thermoplastic skins or layers such as the layers 12 and 16.

The composite component or member 10 may be compression or press molded using a variety of technologies which use a low temperature, compression molding apparatus. For example, the core 18 and the layers 12 and 16 are preferably generally of the type shown in U.S. Pat. Nos. 6,537,413; 6,050,630; and 2005/0189674.

The resulting member 10 may have thickness in the range of 5 to 25 mm and the crushed portion 20 of the member 10 may have a thickness less than 4 mm such as 3 mm.

In one example method of making the member 10, the member 10 is formed by pressing a stack of material in the low-pressure, cold-forming mold, the stack being made up of the first skin 12, the cellular core 18 and the second skin 16. The stack may be pressed at a pressure lying in the range $10 \times 10^5$ Pa. to $30 \times 10^5$ Pa. The first and second skins 12 and 16 are preferably pre-heated in the method to make them malleable and stretchable. Advantageously, in order to soften the first and second skins 12 and 16, heat is applied to a pre-assembly constituted by the stack made up of at least the first skin 12, of the cellular core 18, and of the second skin 16 so that, while the member 10 is being formed in the mold, the first and second skins 12 and 16 having a forming temperature lying approximately in the range of 160° C. to 200° C., and, in this example, about 180° C.

As shown in FIGS. 3-6 the crushed interior portion 20 or 20' may be completely enclosed by the rest of the component member 10 or 10'. However, it is to be understood that the crushed portion need not be completely enclosed by the rest of the member 10 or 10'.

A wide variety of welding technologies exist to join or bond the plastic connector 30 or 30' to the outer layer 12 or 12', respectively, such as: ultrasonic welding; vibration welding; thermal welding; spin welding, infrared welding; hot plate welding; and laser welding. U.S. Pat. Nos. 6,066,217 and 5,026,445 are examples of such welding technologies. Also, a wide variety of adhesives such as liquid and heat-sensitive solid film adhesive may be used to join the plastic components together. Oftentimes a mold is used in the bonding process. U.S. Pat. Nos. 8,133,419; 5,534,097 and 2011/0315310 show various examples.

The connector 30 may be a threaded or non-threaded fastener, for fastening the first member 32 to the member 10. The connector 30 may be plastic as shown herein. Some types of plastic, such as nylon or polytetrafluoroethylene (PTFE), can be used for fastenings requiring moderate strength and great resistance to corrosion or for the purpose of electrical insulation. A surface coating may be used to protect the fastener from corrosion, to impart a decorative finish (e.g. jappaning) or otherwise alter the properties of the base material. Selection criteria of the connector materials include temperature, required strength, resistance to corrosion, joint material and cost.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:
  a first member having an aperture or depression;
  a sandwich-type, general planar, structural member including a first outer layer having an outer surface, a second outer layer and a core positioned between the first outer layer and the second outer layer and having a plurality of cavities wherein the outer layers are bonded to the core by press molding and wherein a portion of the structural member is locally crushed by the press molding to form a depression having bottom and side surfaces formed by the first outer layer; and a connector joined or bonded to the bottom surface of the depression of the structural member and being received and retained within the aperture or depression of the first member to connect the members and form the assembly.

2. The assembly as claimed in claim 1, wherein the bottom surface of the depression of the structural member is planar and wherein the connector includes a base portion having a planar surface which opposes and contacts the planar bottom surface of the depression of the structural member.

3. The assembly as claimed in claim 2, wherein the base portion is sized and shaped to correspond to the size and shape of the depression of the structural member to locate the connector within the depression of the structural member.

4. The assembly as claimed in claim 1, wherein the crushed portion of the structural member is completely enclosed by the rest of the structural member.

5. The assembly as claimed in claim 1, wherein the connector comprises a plastic clip bonded to the bottom surface of the depression of the structural member and extending above the depression of the structural member.

6. The assembly as claimed in claim 1, wherein the connector comprises a plastic structure having a plurality of cavities, bonded to the bottom surface of the depression of the structural member and extending above the depression of the structural member.

7. The assembly as claimed in claim 1, wherein the outer layers are fiber-reinforced layers.

8. The assembly as claimed in claim 1, wherein the structural member has a thickness in a range of 5 to 25 mm.

9. An assembly comprising:

a first member having an aperture or depression;

a sandwich-type, structural panel having an attachment feature for use in the interior of a vehicle, the panel including: a first outer layer having an outer surface, a second outer layer and a core positioned between the first outer layer and the second outer layer and having a plurality of cavities wherein the outer layers are bonded to the core by press molding and wherein a portion of the panel is locally crushed by the press molding to form a depression having bottom and side surfaces formed by the first outer layer; and a connector bonded or joined to the bottom surface of the depression of the panel and being received and retained within the aperture or depression of the first member to connect the members and form the assembly.

10. The assembly as claimed in claim 9, wherein the bottom surface of the depression of the panel is planar and wherein the connector includes a base portion having a planar surface which opposes and contacts the planar bottom surface of the depression of the panel.

11. The assembly as claimed in claim 10 wherein the base portion is sized and shaped to correspond to the size and shape of the depression of the panel to locate the connector within the depression of the panel.

12. The assembly as claimed in claim 9, wherein the crushed portion of the panel is completely enclosed by the rest of the panel.

13. The assembly as claimed in claim 9, wherein the connector comprises a plastic clip bonded to the bottom surface of the depression of the panel and extending above the depression of the panel.

14. The assembly as claimed in claim 9, wherein the connector comprises a plastic structure having a plurality of cavities, bonded to the bottom surface of the depression of the panel and extending above the depression of the panel.

15. An assembly for use in the interior of a vehicle, the assembly comprising:

a generally planar first member having an aperture or depression; and a sandwich-type, generally planar, structural member having an attachment feature, the structural member including a first outer layer having an outer surface, a second outer layer and a core positioned between the first outer layer and the second outer layer and having a plurality of cavities wherein the outer layers are bonded to the core by press molding and wherein a portion of the structural member is locally crushed by the press molding to form a first depression having bottom and side surfaces formed by the first outer layer, a size and a shape and having a predetermined first depth and wherein the structural member further includes a connector bonded or joined to the bottom surface of the first depression and being received and retained within the aperture or depression of the first member to connect the members together and form the assembly.

16. The assembly as claimed in claim 15, wherein the members have opposed planar surfaces contacting each other about the portion.

17. The assembly as claimed in claim 15, wherein the connector includes a clip portion and wherein the first member includes an aperture, the clip portion being received and retained within the aperture to unitarily connect the first member and the structural member and form the assembly.

18. The assembly as claimed in claim 15, wherein the first member includes a depression of a predetermined second depth and wherein the first depression and the depression of the first member define a connector-receiving cavity having a height substantially equal to a sum of the first depth and the second depth.

19. The assembly as claimed in claim 18, wherein the connector is inserted into the depression of the first member so that corresponding surfaces of the depression of the first member and the connector are in abutting engagement to unitarily connect the members and form the assembly.

20. The assembly as claimed in claim 15 wherein the connector includes a base portion sized and shaped to correspond to the size and shape of the first depression to locate the connector within the first depression.

21. A sandwich-type, generally planar, structural member having an attachment feature, the member comprising:

a first outer layer having an outer surface, a second outer layer and a core positioned between the first outer layer and the second outer layer and having a plurality of cavities wherein the outer layers are bonded to the core by press molding and wherein a portion of the member is locally crushed by the press molding to form a depression having bottom and side surfaces formed by the first outer layer; and a connector joined or bonded to the bottom surface of the depression to attach a second, generally planar member to the first outer layer of the structural member, wherein the connector comprises a plastic clip bonded to the bottom surface of the depression and extending above the depression.

22. A sandwich-type, structural panel having an attachment feature for use in the interior of a vehicle, the panel comprising:

a first outer layer having an outer surface, a second outer layer and a core positioned between the first outer layer and the second outer layer and having a plurality of cavities wherein the outer layers are bonded to the core by press molding and wherein a portion of the panel is locally crushed by the press molding to form a depression having bottom and side surfaces formed by the first outer layer; and a connector bonded or joined to the bottom surface of the depression to attach a generally planar member to the first outer layer of the panel, wherein the connector comprises a plastic clip bonded to the bottom surface of the depression and extending above the depression.

23. An assembly for use in the interior of a vehicle, the assembly comprising:

a generally planar first member; and a sandwich-type, generally planar, structural member having an attachment feature, the structural member including a first outer layer having an outer surface, a second outer layer and a core positioned between the first outer layer and the second outer layer and having a plurality of cavities wherein the outer layers are bonded to the core by press molding and wherein a portion of the structural member is locally crushed by the press molding to form a first depression having bottom and side surfaces formed by the first outer layer, a size and a shape and having a predetermined first depth and wherein the structural member further includes a connector bonded or joined to the bottom surface of the first depression and attaching the members together to form the assembly, wherein the connector includes a clip portion and wherein the first member includes an aperture, the clip portion being received and retained within the aperture to unitarily connect the first member and the structural member and form the assembly.

* * * * *

UNITED STATES PATENT AND TRADEMARK OFFICE
CERTIFICATE OF CORRECTION

PATENT NO. : 8,859,074 B2  
APPLICATION NO. : 13/762904  
DATED : October 14, 2014  
INVENTOR(S) : Darius J. Preisler et al.

Page 1 of 1

It is certified that error appears in the above-identified patent and that said Letters Patent is hereby corrected as shown below:

In the Claims

Column 6, Line 62, Claim 1:

After "a sandwich-type," delete "general" and  
Insert -- generally --.

Signed and Sealed this  
Tenth Day of February, 2015

Michelle K. Lee  
*Deputy Director of the United States Patent and Trademark Office*